United States Patent
Bacha et al.

(10) Patent No.: US 8,347,070 B1
(45) Date of Patent: Jan. 1, 2013

(54) SYSTEM AND METHODS FOR SHARING PLATFORM DATA WITH AN ACPI MODULE OF A COMPUTER SYSTEM

(75) Inventors: Anys Bacha, Roseville, CA (US); Thanh Minh Pham, Elk Grove, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 642 days.

(21) Appl. No.: 12/261,926

(22) Filed: Oct. 30, 2008

(51) Int. Cl.
*G06F 9/00* (2006.01)
*G06F 15/177* (2006.01)

(52) U.S. Cl. .......................................................... 713/2

(58) Field of Classification Search .................... 713/1, 2
See application file for complete search history.

(56) References Cited

U.S. PATENT DOCUMENTS

| | | | |
|---|---|---|---|
| 7,107,441 B2* | 9/2006 | Zimmer et al. | 713/1 |
| 7,293,184 B2* | 11/2007 | Zimmer et al. | 713/320 |
| 7,418,714 B2* | 8/2008 | Hills et al. | 719/318 |
| 7,856,550 B2* | 12/2010 | Hutchison | 713/1 |
| 2004/0243534 A1* | 12/2004 | Culter et al. | 707/1 |
| 2006/0020940 A1* | 1/2006 | Culter | 718/100 |

\* cited by examiner

*Primary Examiner* — Mohammed Rehman

(57) ABSTRACT

A method and system for sharing platform data are described. The method for sharing platform data includes during a boot sequence of system firmware, accessing a first data structure tag associated with a resource accessible by the operating system. Also during the boot sequence of the system firmware, the method includes determining a memory address corresponding to platform specific data associated with the resource. During a boot time sequence of the system firmware, run time code is parsed. The method includes accessing a second tag that is visible to the operating system and associating it with the location of the platform specific data. This allows for the platform specific data to be consumed by an operating system during runtime in accordance with the industry common interfaces defined in ACPI.

16 Claims, 4 Drawing Sheets

300

During a boot sequence of BIOS/System Firmware, accessing a first data structure tag associated with a resource accessible by the operating system
302

During the boot sequence BIOS/System Firmware, determining a memory address corresponding to platform specific data associated with the resource
304

During a boot time sequence of the BIOS/System Firmware, accessing a second data tag (ASL object name) associated with the first resource
306

During the boot time of the BIOS/System Firmware, associating the second data with the location of the platform specific data associated with the resource
308

FIG. 3

SYSTEM AND METHODS FOR SHARING PLATFORM DATA WITH AN ACPI MODULE OF A COMPUTER SYSTEM

BACKGROUND

Advanced Configuration and Power Interface (ACPI) is a standard that has been developed to define parameters for an operation system of a computer to recognize available resources. ACPI can be used to describe resources information such as a number of available CPUs (Central Processing Units), amount of memory, peripherals, etc.

BRIEF DESCRIPTION OF THE DRAWINGS

FIG. 3 is a flow diagram of an exemplary method for sharing platform data in accordance with embodiments of the present technology.

Figure 1:
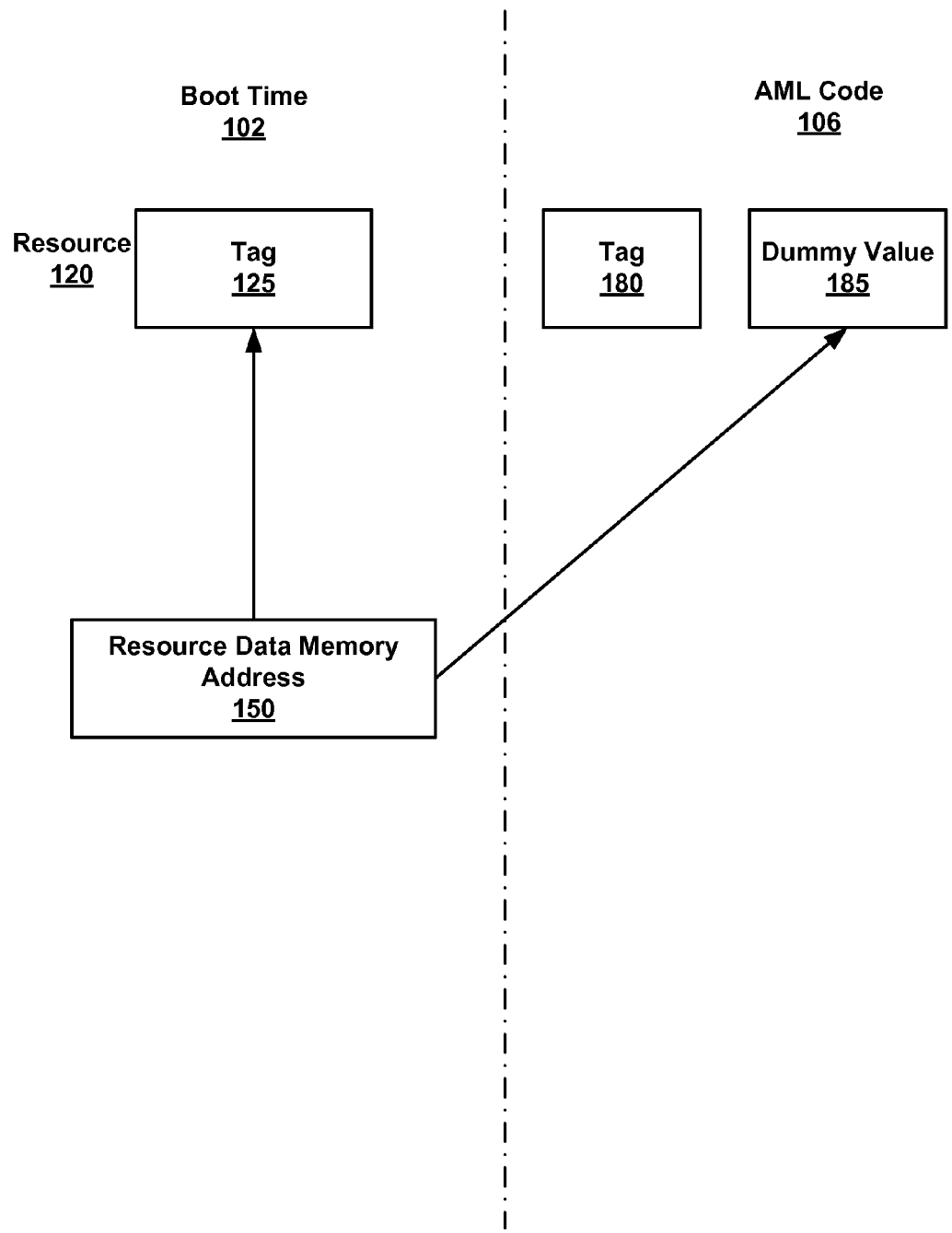
FIG. 1 is a block diagram of sharing platform data between a boot time environment and a run time environment in accordance with embodiments of the present technology.

The drawings referred to in this description should be understood as not being drawn to scale except if specifically noted.

DETAILED DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving", "determining", "enabling", "accessing", "identifying", "associating", "indexing", "parsing", "generating", "tagging," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and mechanical computers.

Embodiments of the present technology provide a mechanism for dynamically sharing platform information available in data structures with AML (ACPI machine language). The present technology in one embodiment eliminates the need to rely on ACPI Operation Regions that use fixed address locations for consuming system data. Using fixed Operation Regions can result in the need to rebuild firmware images which makes using fixed Operation Regions unattractive for code bases that need to support multiple platforms. Embodiments of the present technology enable the use of a single code base to support multiple platforms.

Embodiments of the present invention use data structures that are tagged in main memory which removes the requirement of the AML code tracking the location of data structures every time the system is booted. Embodiments of the present technology enable the AML code to be flexible and unsusceptible to choosing random memory locations for the data structures during boot. In other words, the AML code is unsusceptible to where the allocation of data structures occur in memory during boot.

FIG. 1 is a block diagram of sharing platform data between a boot time environment 102 and a AML code 106 consumed by the Operating System at run time environment in accordance with embodiments of the present technology. In one embodiment, during boot time 102, a first resource 120 is associated with a tag 125. The tag 125 is associated with resource data at a particular address 150 corresponding to the resource 120.

Embodiments of the present technology enable the resource data memory address 150 of the platform data to replace a dummy value 185 associated with a tag 180 that is also associated with resource 120 while processing AML code 106. In one embodiment, the replacement occurs during boot time and not OS runtime. In one embodiment, tag 180 is an ObjectName declared in ASL.

Tagging on the boot time side serves the purpose of linking a data structure to an identifier. In one embodiment, the data structure tag comprises three characteristics. The first characteristic of the tag is related to its address. The address of the tag represents the address of the data structure. In FIG. 1, the resource data memory address 150 represents the address of the data structure for resource 120.

The second characteristic of the tag is related to its value. The value of the tag must match the value of an Object name that can be used to point to the Boot time structure (e.g., a C-coded structure) from the ASL (e.g., tag 180) in AML code 106.

The third characteristic is related to uniqueness. The tag must be unique to avoid collisions in the namespace in addition to any conflict that may occur with similar tags or ObjectNames during a parsing phase.

In addition to data structure tagging, ASL tagging is required. ASL tagging allows for an ObjectName (e.g., tag 180) to serve as an identifier that holds the memory address of the data structure. The ObjectName can be then passed to an operation region which can be used for reading and writing data fields corresponding to the data structure.

The final step is to perform AML parsing. The purpose of parsing the code is to update the dummy value 185 of the ASL declared object name (tag 180) with the correct address (address 150) of the structure used in boot time 102.

Figure 2:
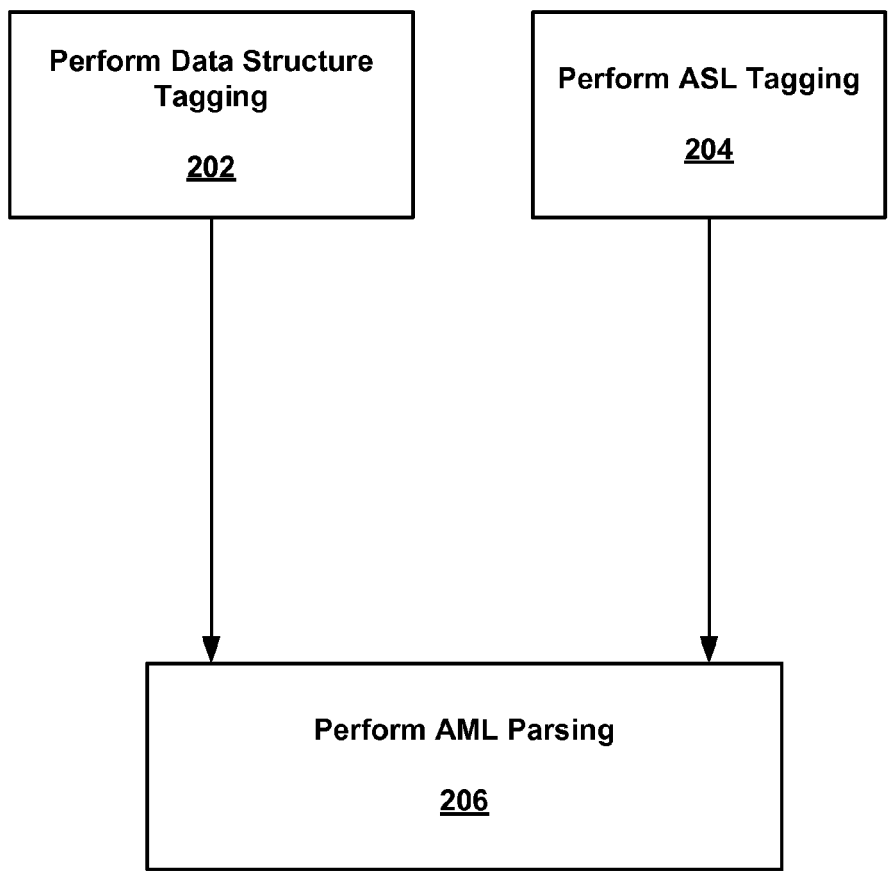
FIG. 2 is a flow diagram for modifying machine language to enable sharing of platform data in accordance with embodiments of the present technology.

FIG. 2 is a flow diagram of a method 200 for modifying machine language to enable sharing of platform data in accordance with embodiments of the present technology.

At 202, performing data structure tagging may be performed by the following example:

```
typedef struct{
UINT32      tag;//the structure corresponding to CPU0 is assigned
            // a tag = 0x30555043 (equivalent to "CPU0" in ASCII)
            //the structure corresponding to CPU1 is assigned
            //a tag = 0x31555043 (equivalent to "CPU1" in ASCII)
UINT8       enabled;
UINT8       present;
UNIT8       Sun;
...
}CpuStruct;
typedefstruct {
CpuStruct   PlatformCpus[2]; //declare CPU0 and CPU1
...
}PlatformStruct;
```

At 204, performing ASL tagging may be performed by the following example:

```
Scope(/)
{
//Declare an ObjectName using the following format:
//Name(<tag name>, <dummy 32-bit address>)
Name(CPU, 0x5A5A5A5A)//0x5A5A5A5A is updated with the correct //address of the CPU 0 data structure
   Scope(/_SB_)
   {
   ...
   //Declare Operation Region with its offset field pointing to
   //the value of ObjectName CPU0
   Name(CPUP, Zero)
   Store(CPU0,CPUP)
   OperationRegion(CPUR, SystemMemory, CPUP)
   Field (CPUR, AnyAcc,NoLock,Preserve)
   {
      ,32,//ignore first 32-bit field
         // corresponding to tag
      PRES, 8, //present field
      ENBL, 8, //enable field
      CSUN, 8, //CPU sun field
      ...
   }
   ...
}
```

At 206, performing AML parsing may be performed by the following example:
1. Load the AML file that needs to be parsed into memory.
2. Lookup the tag field that corresponds to the data structure intended for sharing.
3. Parse the ACPI file for the AML op-code corresponding to the ObjectName declaration followed by the ObjectName that corresponds to the tag included in the data structure.
4. Update the Object field in the Name( ) declaration with the address of the tag declared in the data structure.
5. Publish the updated AML file for consumption by the operating system.

FIG. 3 is a flow diagram of an exemplary method 300 for sharing platform data in accordance with embodiments of the present technology.

At 302, 300 includes during a boot sequence of system firmware, accessing a first data structure tag associated with a resource accessible by the operating system. For example, the resource could be a CPU or memory. In one embodiment, the first data structure tag is associated with a C based data structure containing platform data which is consumed by the operating system via AML methods. In one embodiment, the first data structure tag is an ASL based ObjectName.

At 304, 300 includes during the boot sequence of the system firmware, determining a memory address corresponding to platform specific data associated with the resource. In one embodiment, the memory address is an address in main memory associated with the platform.

At 306, 300 includes using a second tag associated with the first resource. In one embodiment, the second tag is associated with ASL for enabling an AML code sequence. In one embodiment, the second tag is an ObjectName.

At 308, 300 includes using ASL code to associate the second tag with the platform specific data associated with the resource. In one embodiment, 308 further includes loading an ACPI table and replacing a dummy entry of the object name in the table with the address determined in 304. The address determined in 304 represents the location of platform specific data. In one embodiment, 304 is performed by the boot time code which parses the runtime code that will be executed by the operating system.

Example Computer System Environment

Figure 4:
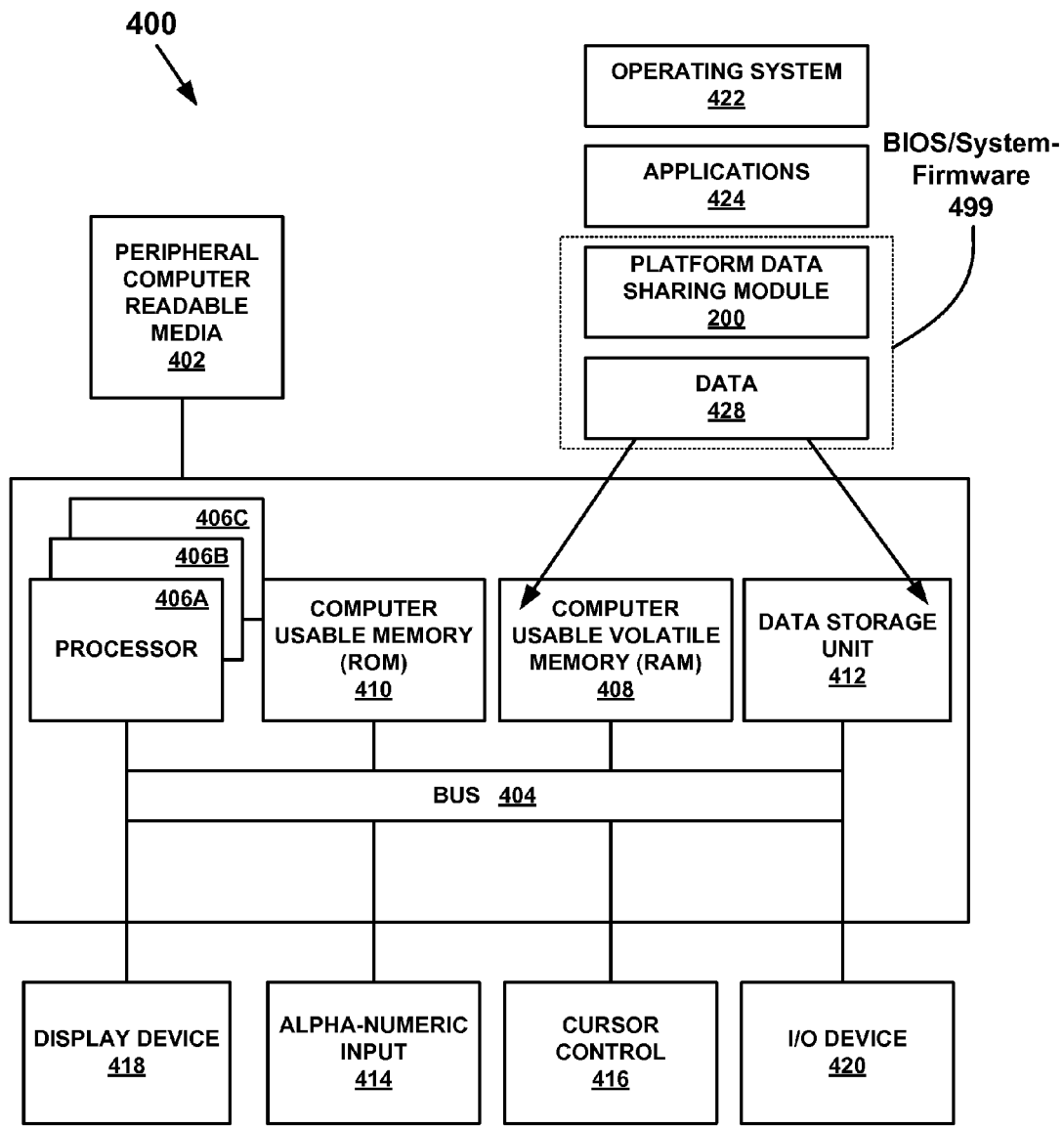
FIG. 4 is block diagram of an exemplary computer system in accordance with embodiments of the present technology.

With reference now to FIG. 4, portions of the technology for sharing platform data are composed of computer-readable and computer-executable instructions that reside, for example, in computer-usable storage media of a computer system. That is, FIG. 4 illustrates one example of a type of computer that can be used to implement embodiments, which are discussed below, of the present technology.

FIG. 4 illustrates an example computer system 400 used in accordance with embodiments of the present technology. It is appreciated that system 400 of FIG. 4 is an example only and that the present technology can operate on or within a number of different computer systems that use ACPI, including blade servers, general purpose networked computer systems, embedded computer systems, routers, switches, server devices, user devices, various intermediate devices/artifacts, stand alone computer systems, mobile phones, personal data assistants, and the like. It is also appreciated that system 400 may be one of a plurality of like systems that can be combined and partitioned in accordance with embodiments of the present technology. In one embodiment, system 400 is a single blade computer system of a multi-blade server system. However, in another embodiment, system 400 is a multi-blade computer server system.

As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet.

Referring still to FIG. 4, various other components are depicted for system 400. Specifically, when present, an operating system 422, applications 424, platform data sharing module 200, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, is stored as BIOS/System Firmware 499 in memory locations within RAM 408 and memory areas ROM 410. The present technology is applied to BIOS/system firmware to enable data sharing with operating system 422 during run time.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enabling platform data to be shared with an Advanced Configuration and Power Interface (ACPI) module of a computer system comprising:
   during a boot sequence of system firmware associated with said computer system, accessing a first data structure tag associated with a first resource accessible by said system firmware,
   during said boot sequence of said system firmware, determining a memory address corresponding to platform specific data associated with said first resource;
   during said boot sequence of said system firmware, associating a second tag with said platform specific data associated with said first resource, wherein said second tag is an object name;
   during said boot sequence of said system firmware, replacing a dummy entry of said object name in a loaded ACPI table with said memory address, wherein said associating of said second tag and said replacing of said dummy entry are performed by boot time code which parses run time code that will be executed by an operating system; and
   providing ACPI machine language (AML) code setup for runtime environment of said operating system, enabling access of said platform specific data associated with said first resource based on a value associated with said second tag.

2. The method of claim 1 further comprising:
   during said boot sequence of said system firmware, determining said memory address resides in a main memory accessible by said system firmware.

3. The method of claim 1 wherein said second tag is associated with source language of said ACPI module.

4. The method of claim 1 wherein said first data structure tag is configured to match an object name declared in ASL.

5. The method of claim 1 further comprising:
   loading an ACPI table; and
   replacing the value of said second tag with said memory address corresponding to platform specific data associated with said first resource.

6. The method of claim 1 further comprising:
   said ACPI module providing said platform specific data associated with said first resource to said operating system.

7. A computer readable storage medium comprising instructions that when executed cause a computer system to perform a method for enabling platform data to be shared with an Advanced Configuration and Power Interface (ACPI) module, said method comprising:
   during a boot sequence of system firmware associated with said computer system, accessing a first data structure tag associated with a first resource accessible by said system firmware and operating system,
   during said boot sequence of said system firmware, determining a memory address corresponding to platform specific data associated with said first resource;

during said boot sequence of said system firmware, accessing a second tag associated with said first resource, wherein said second tag is an object name;

during said boot sequence of said system firmware, associating said second tag with said memory address of said platform specific data associated with said first resource;

during said boot sequence of said system firmware, replacing a dummy entry of said object name in a loaded ACPI table with said memory address, wherein said associating of said second tag with said first resource and said replacing of said dummy entry are performed by boot time code which parses run time code that will be executed by said operating system; and having ACPI machine language (AML) code setup for runtime environment of said operating system, enabling access of said platform specific data associated with said first resource based on said second tag.

8. The computer readable storage medium of claim 7 wherein said method further comprises:

during said boot sequence of said system firmware, determining said memory address resides in a main memory accessible by said system firmware and operating system.

9. The computer readable storage medium of claim 7 wherein said second tag is declared in source language of said ACPI module.

10. The computer readable storage medium of claim 7 wherein said first data structure tag matches an object name declared in ASL.

11. The computer readable storage medium of claim 7 wherein said method further comprises:

loading an ACPI table; and replacing said second tag with said memory address corresponding to platform specific data associated with said first resource.

12. The computer readable storage medium of claim 7 wherein said method further comprises:

said ACPI module providing said platform specific data associated with said first resource to said operating system.

13. A system for enabling platform data to be shared with an Advanced Configuration and Power Interface (ACPI) module of a computer system comprising:

a data structure tagging method configured to:

during a boot sequence of system firmware associated with said computer system, access a first data structure tag associated with a first resource accessible by an operating system, during said boot sequence of said system firmware, determine a memory address corresponding to platform specific data associated with said first resource and update the value of a second tag declared in ACPI source language (ASL), wherein said second tag is an object name;

an ACPI data sharing module configured to perform:

during a boot sequence of said system firmware, access said second tag associated with said first resource; and during said boot sequence of said system firmware, associate said second tag declared in ASL with the memory address of said platform specific data associated with said first resource that uses an ACPI machine language parsing module to enable proper access of said platform specific data associated with said first resource to said operating system; and during said boot sequence of said system firmware, replace a dummy entry of said object name in a loaded ACPI table with said memory address, wherein said association of said second tag with said first resource and said replacement of said dummy entry are performed by boot time code which parses run time code that will be executed by said operating system.

14. The system of claim 13 wherein said first data structure tag is configured to match an ASL declared object name.

15. The system of claim 13 wherein said ACPI machine language parsing module is further configured to:

consume an ACPI table; and update the value of said second tag with the memory address of said platform specific data associated with said first resource.

16. The system of claim 13 wherein said ACPI machine language parsing module is used to:

enable proper access to said platform specific data associated with said first resource to be accessible by said operating system.

* * * * *